US009408083B2

United States Patent
Riesenberg et al.

(10) Patent No.: US 9,408,083 B2
(45) Date of Patent: Aug. 2, 2016

(54) SYSTEM, METHOD, AND COMPUTER PROGRAM PRODUCT FOR DETERMINING PLACEMENT OF A SMALL CELL IN A LOCATION WITHIN A CELLULAR NETWORK

(71) Applicant: TEOCO CORPORATION, Fairfax, VA (US)

(72) Inventors: Ehud Riesenberg, Ramat-Gan (IL); Michael Livschitz, Givat Zeev (IL)

(73) Assignee: TEOCO Corporation, Fairfax, VA (US)

( * ) Notice: Subject to any disclaimer, the term of this patent is extended or adjusted under 35 U.S.C. 154(b) by 0 days.

(21) Appl. No.: 14/672,092

(22) Filed: Mar. 27, 2015

(65) Prior Publication Data
US 2015/0281976 A1  Oct. 1, 2015

Related U.S. Application Data

(60) Provisional application No. 61/973,309, filed on Apr. 1, 2014.

(51) Int. Cl.
 *H04W 40/00* (2009.01)
 *H04W 16/18* (2009.01)
 *H04W 64/00* (2009.01)

(52) U.S. Cl.
 CPC .............. *H04W 16/18* (2013.01); *H04W 64/00* (2013.01)

(58) Field of Classification Search
 None
 See application file for complete search history.

(56) References Cited

U.S. PATENT DOCUMENTS

| 8,331,384 B2 | 12/2012 | Ghai |
| 8,504,032 B2 | 8/2013 | Lott et al. |
| 8,644,273 B2 | 2/2014 | Choi et al. |
| 8,693,397 B2 | 4/2014 | Ho et al. |
| 2009/0097452 A1 | 4/2009 | Gogic |
| 2009/0318124 A1* | 12/2009 | Haughn ............ G06F 8/65 455/418 |
| 2013/0143541 A1 | 6/2013 | Henderson et al. |
| 2013/0196680 A1 | 8/2013 | Soliman et al. |
| 2013/0223284 A1 | 8/2013 | Davies et al. |
| 2013/0237227 A1 | 9/2013 | Nagaraja et al. |
| 2013/0294264 A1 | 11/2013 | Nagaraja et al. |
| 2015/0065133 A1* | 3/2015 | Cui .............. H04W 36/22 455/436 |

OTHER PUBLICATIONS

Pending U.S. Appl. No. 61/973,309, filed Apr. 1, 2014.

* cited by examiner

*Primary Examiner* — Vladimir Magloire
*Assistant Examiner* — Sayed T Zewari
(74) *Attorney, Agent, or Firm* — ATFirm PLLC; Ralph P. Albrecht

(57) ABSTRACT

A system, method, and computer program product can determine a need to place a small cell in a particular location covered by a cellular network. Accordingly usage of a network resource by one or more user devices within the confinement of a particular location can be recorded. When the usage exceeds a predetermined threshold for that network resource, and upon determination that such an area could be better served by a small cell, a notification can be generated of the location and the one or more user devices so that such a small cell, such as, e.g., but not limited to, a femtocell, can be effectively placed in the location. In certain embodiments, an area representative of a plurality of user devices may be determined. In such embodiments, the location can be determined within the area.

20 Claims, 3 Drawing Sheets

SYSTEM, METHOD, AND COMPUTER PROGRAM PRODUCT FOR DETERMINING PLACEMENT OF A SMALL CELL IN A LOCATION WITHIN A CELLULAR NETWORK

CROSS REFERENCE TO RELATED APPLICATIONS

The present disclosure is a U.S. NonProvisional patent application, which claims the benefit under 35 U.S.C. Section 119(e) of U.S. Provisional Patent Application No. 61/973,309, Conf. No. 5005, filed Apr. 1, 2014, entitled, "A System and Method for Determining Placement of a Small Cell in a Location Within a Cellular Network," the content of which is incorporated herein by reference in its entirety.

BACKGROUND

1. Field of the Disclosure

The disclosure generally relates to small cells within a cellular network and particularly to placement of small cells within a cellular network, wherein the small cell is typically a femtocell.

2. Related Art

As data consumption increases, mobile operators have looked to various solutions to offload at least a portion of internet data traffic from the cellular network. In one such solution, operators use small cells to extend their service coverage and increase network capacity and reducing the load on the larger cells. The use of a small cell to aggregate the data (but also calls) provides for a more effective use of the bandwidth available to the larger cells and accounts for better overall quality of service (QoS).

Small cells can be used to provide in-building and outdoor cellular service within a confined location. Mobile operators can use such small cells to offload traffic as much as eighty percent during peak times, in congested areas. Small cells typically have a limited range of coverage, which can be from ten meters within urban locations to two kilometers for a rural location. By contrast, a typically the range of a standard base station is up to thirty-five (35) kilometers. A microcell is typically less than two (2) kilometers wide, a picocell is two-hundred (200) meters or less, and a femtocell is on the order of ten (10) meters.

It would therefore be advantageous for a mobile operator to be able to place small cells in an efficient manner, thus reducing infrastructure costs.

SUMMARY

The disclosure sets forth systems, methods and computer program products relating to a computerized method for determining the need to place a small cell in a location within a cellular network for handling at least a portion of a cellular network traffic with respect to a cellular network resource, the method can include: identifying, by at least a processor, at least a user device, the user device communicatively coupled to the cellular network resource via a cell of the cellular network; determining, by the at least a processor, a physical location of the at least a user device; collecting information, by the at least a processor, relating to the usage of the cellular network resource by the at least a user device; and generating, by the at least a processor, a notification to place a small cell in the physical location, upon determination based on the collected information that a usage threshold relating to the cellular network resource was crossed.

In one embodiment, the computerized method can further include determining, by the at least a processor, the usage threshold.

In one embodiment, the computerized method can include where the determining the usage threshold further can include determining, by the at least a processor, a bandwidth provided by the network resource to the at least a user device.

In one embodiment, the computerized method can include where the determining the usage threshold further can include determining, by the at least a processor, an amount of data provided by the cellular network resource to the at least a user device within a time frame.

In one embodiment, the computerized method can include where the determining the usage threshold further can include determining, by the at least a processor, the strength of the radio frequency (RF) signal provided to the at least a user device.

In one embodiment, the computerized method can include where the small cell can include any of: microcell, picocell, or femtocell, etc.

In one embodiment, the computerized method can further include determining, by the at least a processor, an area representative of a plurality of physical locations, the plurality of physical locations representative of a plurality user devices, and wherein the generated notification is to place a small cell within the area.

In another embodiment, a computerized system configured for determining the need to place a small cell in a location within a cellular network for handling at least a portion of a cellular network traffic with respect of to a cellular network resource, can include: a processing unit; a network interface communicatively coupled to the processing unit; a memory communicatively coupled to the processing unit, the memory containing instructions that when executed by the processing unit configure the system to: identify at least a user device, the user device communicatively coupled to the cellular network resource via a cell of the cellular network; determine a physical location of the at least a user device; collect information related to the usage of the cellular network resource by the at least a user device; and generate a notification to place a small cell in the physical location, upon determination based on the collected information that a usage threshold relating to the cellular network resource was crossed.

In one embodiment, the system can further include containing instructions that when executed by the processing unit configure the system to determine the usage threshold.

In one embodiment, the system can further include containing instructions that when executed by the processing unit configure the system to determine a bandwidth provided by the network resource to the at least a user device.

In one embodiment, the system can further include containing instructions that when executed by the processing unit configure the system to determine an amount of data provided by the network resource to the at least a user device within a time frame.

In one embodiment, the system can further include containing instructions that when executed by the processing unit configure the system to determine the strength of the radio frequency (RF) signal provided to the at least a user device.

In one embodiment, the system can include where the small cell can include any of: microcell, picocell, and/or femtocell, etc.

In one embodiment, the system can further include containing instructions that when executed by the processing unit configure the system to determine an area related to a plurality of physical locations, the plurality of physical locations representative of a plurality user devices, and wherein the generated notification is to place a small cell within the area.

In yet another embodiment, a computer program product embodied on a nontransitory computer accessible medium, the computer program product can include instructions, which when executed by a processing unit, performs a method of determining the need to place a small cell in a location within a cellular network for handling at least a portion of a cellular network traffic with respect to a cellular network resource, the method can include: identifying at least a user device, the user device communicatively coupled to the cellular network resource via a cell of the cellular network; determining a physical location of the at least a user device; collecting information related to the usage of the cellular network resource by the at least a user device; and generating a notification to place a small cell in the physical location, upon determination based on the collected information that a usage threshold relating to the cellular network resource was crossed.

In one embodiment, the computer program product can include where the method can further include determining the usage threshold.

In one embodiment, the computer program product can include where the method can include where the determining the usage threshold of the method further can include determining a bandwidth provided by the network resource to the at least a user device.

In one embodiment, the computer program product can include where the method can include where the determining the usage threshold of the method further can include determining an amount of data provided by the cellular network resource to the at least a user device within a time frame.

In one embodiment, the computer program product can include where the method can include where the determining the usage threshold of the method can further include determining the strength of the radio frequency (RF) signal provided to the at least a user device.

In one embodiment, the computer program product can include where the method can include where the small cell can include any of: microcell, picocell, and/or femtocell, etc.

In one embodiment, the computer program product can include where the method can further include where the determining an area representative of a plurality of physical locations, the plurality of physical locations representative of a plurality user devices, and wherein the generated notification is to place a small cell within the area.

BRIEF DESCRIPTION OF THE DRAWINGS

The subject matter disclosed is particularly pointed out and distinctly claimed in the claims at the conclusion of the specification. The foregoing and other objects, features and advantages of the disclosure will be apparent from the following detailed description taken in conjunction with the accompanying drawings.

The accompanying drawings, which are included to provide a further understanding and are incorporated in and constitute a part of this specification, illustrate exemplary, and nonlimiting embodiments and together with the description serve to explain the principles disclosed herein. In the drawings, like reference numbers may indicate substantially similar, equivalent, or exemplary elements, and the left most digits in the corresponding reference number indicate the drawing in which an element first appears.

DETAILED DESCRIPTION OF VARIOUS EXEMPLARY EMBODIMENTS

Figure 1:
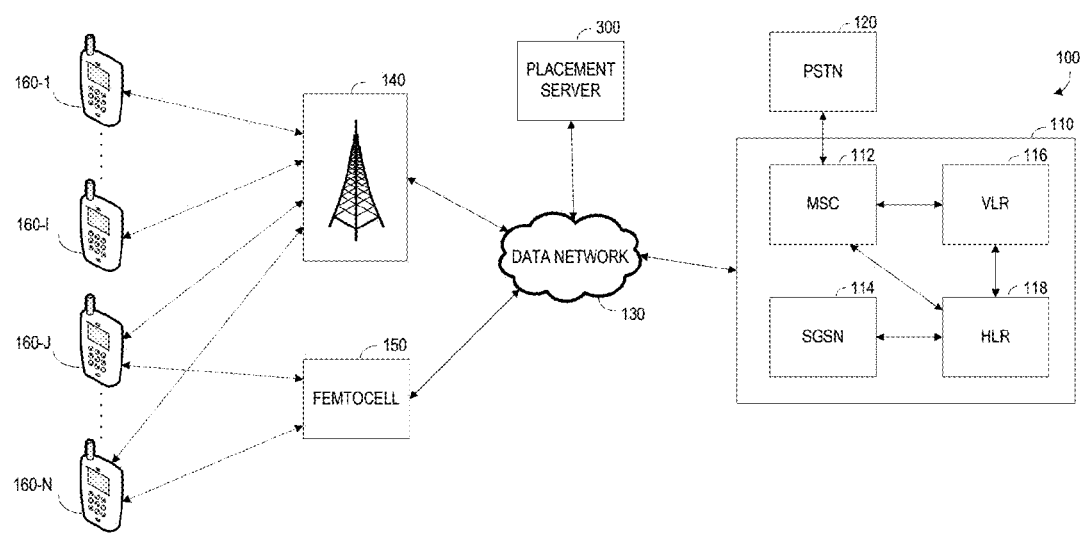
FIG. 1—is a schematic illustration of a placement server communicatively coupled with a core of a Global System for Mobile communication (GSM) network.

It is important to note that the embodiments disclosed in the disclosure are only examples of the many advantageous uses of the innovative teachings herein. In general, statements made in the specification of the present application do not necessarily limit any of the various claims. Moreover, some statements may apply to some exemplary inventive features but not to others. In general, unless otherwise indicated, singular elements may be in plural and vice versa with no loss of generality. In the drawings, like numerals refer to like parts through several views.

A system and method, in an exemplary embodiment, can determine a need to place a small cell in a particular location covered by a cellular network. Accordingly, usage of a network resource by one or more user devices within the confinement of a particular location is recorded. When the usage exceeds a predetermined threshold for that network resource, and determination that such an area could be better served by a small cell, a notification can be generated relating to the location and the one or more user devices so that such a small cell, such as, e.g., but not limited to, a femtocell, can be effectively placed in the location. In certain embodiments, an area relating to a plurality of user devices may be determined. In such embodiments, the location can be determined within the area.

FIG. 1 is an exemplary and non-limiting schematic illustration of a placement server 300 communicatively coupled with a core 110 of a Global System for Mobile communication (GSM) network. The core 110 can include a Mobile Switching Center (MSC) 112, a Serving General Packet Radio Service (GPRS) Support Node (SGSN) 114, a Visitor Location Register (VLR) 116 and/or a Home Location Register (HLR) 118, in an exemplary embodiment. The VLR 116 can be communicatively coupled to the HLR 118 and MSC 112. HLR 116 can be further communicatively coupled to the MSC 112 and/or the SGSN 114, in one embodiment. MSC 112 can be further communicatively coupled to a Public Switched Telephone Network (PSTN) 120. Core 110 can be further communicatively coupled to data network 130, Radio Network Subsystem (RNS) 140 and/or femtocell 150, in one exemplary embodiment. Femtocell 150 can be communicatively coupled to data network 130, such that at least a portion of cellular network traffic can be transferred to Core 110 through the data network 130, thus reducing loads and providing improved quality of service (QoS). A first group of user devices 160-1 through 160-I, generally referenced first user devices 160, can be wirelessly communicatively coupled to RNS 140, in one embodiment. A second group of user devices 160-J to 160-N can be wirelessly communicatively coupled to RNS 140, and can be further wirelessly communicatively coupled to femtocell 150, in an embodiment. It should be noted that 'N', 'I' and 'J' are integers having a value of '1' or greater, in an example embodiment. The placement server 300 is configured to execute methods described herein with respect of FIG. 2. The server 300 may be connected directly, or coupled, to the core 110 (not shown) or indirectly by connecting, or coupling the server 300 to the data network 130 (shown). In other embodiments, other mobile cellular systems, such as, e.g., but not limited to, Universal Mobile Telecommunications System (UMTS) can be utilized with parallel components without departing from the scope of this disclosure.

Figure 2:
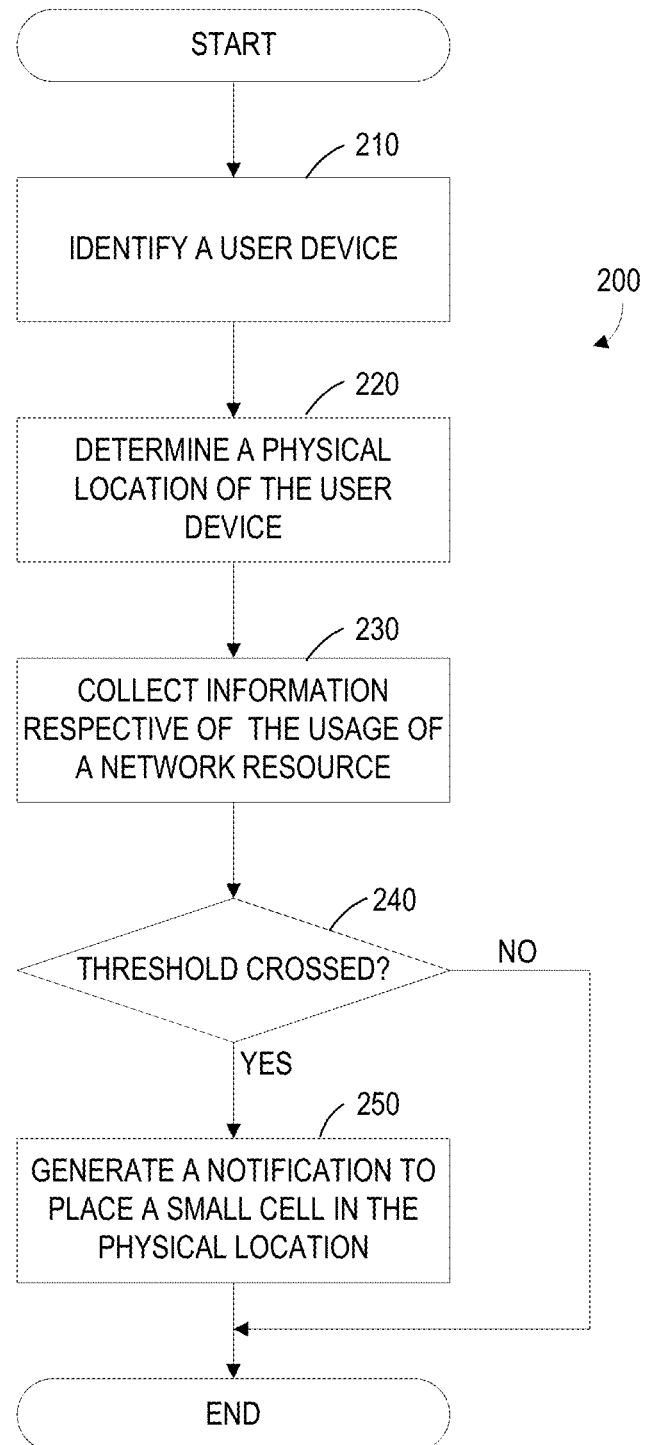
FIG. 2—is a flowchart of a method for determining placement of a small cell in a location within a cellular network according to an embodiment.

FIG. 2 is an exemplary and non-limiting exemplary flowchart of a method for determining a need to place a small cell in a location within a cellular network for handling at least a portion of a network traffic according to an embodiment. In 210 at least a user device can be identified, the user device can be communicatively coupled to a network resource via an exemplary cell, such as, e.g., but not limited to, RNS 140, of the cellular network, in one embodiment. In 220 a physical location of the at least a user device can be determined, in one embodiment. In 230 information related to the usage of the network resource by the at least a user device can be collected, in one embodiment. In 240 the usage of the resource by the at least a user device can be determined, in one embodiment. Determining the usage of the resource may include, e.g., but not limited to, determining a bandwidth provided by the cell to the at least a user device, determining an amount of data provided by the cell to the at least a user device within a time frame, determining the strength of the radio frequency (RF) signal provided to the user device, and the like, in one embodiment. A threshold may be determined related to the usage, in one embodiment. The threshold can be determined, for example, but not limited to, as a certain percentage relating to the usage of the resource, in one embodiment. For example, the threshold may be a percentage of available data bandwidth, and/or a user device requiring twenty-five percent (25%) or higher of that bandwidth can cross the threshold, in one exemplary embodiment. In certain other embodiments, the threshold can be further determined related to the total usage of the resource of the cell. For example, a cell may have a capacity to serve one gigabyte per second (1 Gb/s) of data. A user device can be served one half (0.5) Gb/s, in one embodiment. If the total amount of data provided by the cell at any given time is under, e.g., but not limited to, three quarters (0.75) Gb/s the user does not cross the threshold, in one embodiment. However, if the total amount provided is over, e.g., but not limited to, 0.75 Gb/s, or if the demand if over, e.g., 0.75 Gb/s, a user device being served 0.5 Gb/s can be considered as crossing a usage threshold, in one example embodiment. In 240 a check can be performed to determine if the threshold was crossed, in one embodiment. If the threshold was crossed, execution can continue at 250, otherwise, execution can end, in one embodiment. In 250 a notification to place a small cell within the physical location can be generated in one embodiment. A small cell is a cell in a cellular network served by a low power cellular base station, covering a limited area, in one embodiment. A typical small cell may include, e.g., but not limited to, a microcell, picocell or femtocell. In certain embodiments, an area related to a plurality of locations can be determined, the plurality of locations can be related to a plurality user devices, in one embodiment. In such example embodiments, the physical location of 250 can be within the area.

Figure 3:
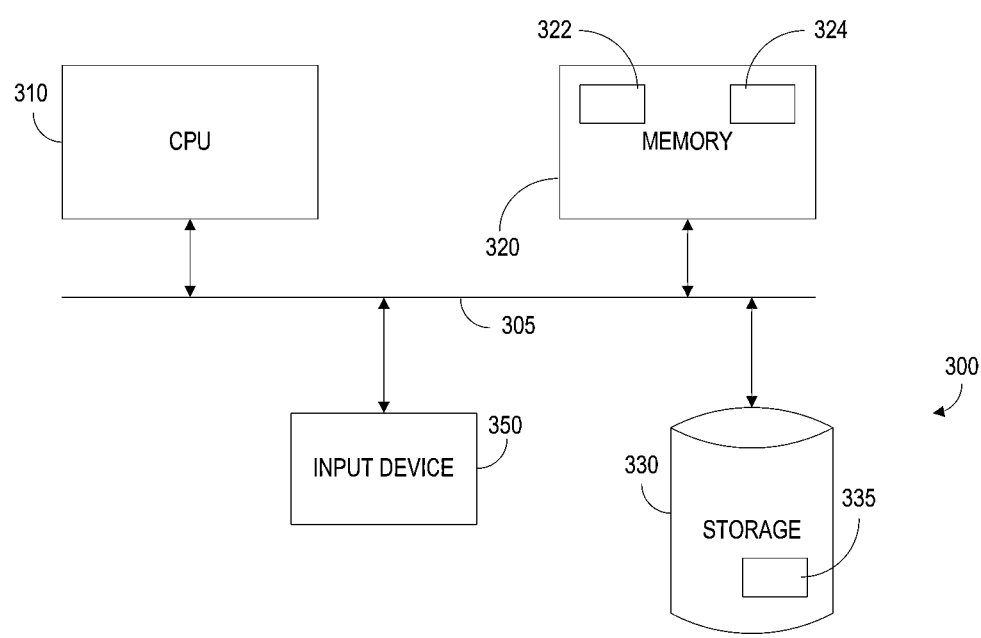
FIG. 3—is a schematic illustration of a placement system according to an embodiment.

FIG. 3 illustrates an exemplary and non-limiting schematic illustration of a placement server 300 according to an embodiment. The server 300 comprises at least one processing element 310, for example, a central processing unit (CPU) 310, in one embodiment. The CPU 310 can be coupled via an exemplary bus 305 to an example memory 320. The memory 320 can further include, in one embodiment, a memory portion 322 that can contain instructions that when executed by the processing element 310 can perform the method described in more detail herein. The memory may be further used as a working scratch pad for the processing element 310, a temporary storage, and others, as the case may be, in one embodiment. The memory may include volatile memory such as, e.g., but not limited to, random access memory (RAM), or non-volatile memory (NVM), such as, e.g., but not limited to, Flash memory. Memory 320 may further include in one embodiment, a memory portion 324 containing a physical location of a user device. The processing element 310 may be coupled to an input 350, in one embodiment. The processing element 310 may be further coupled with a storage 330 in one embodiment. Storage 330 may be used for the purpose of holding a copy of the method executed in accordance with the disclosed technique. Storage 330 may further comprise storage portion 335 containing a list of positions in which to place small cells, in one embodiment.

The principles disclosed can be implemented as hardware, firmware, software or any combination thereof. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as a processing unit ("CPU"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit and/or display unit.

All examples and conditional language recited herein are intended for pedagogical purposes to aid the reader in understanding the principles of the disclosure and the concepts contributed by the inventor to furthering the art, and are to be construed as being without limitation to such specifically recited examples and conditions. Moreover, all statements herein reciting principles, aspects, and embodiments of the disclosure, as well as specific examples thereof, are intended to encompass both structural and functional equivalents thereof. Additionally, it is intended that such equivalents include both currently known equivalents, as well as equivalents developed in the future, i.e., any elements developed that perform the same function, regardless of structure.

What is claimed is:

1. A computerized method for determining the need to place a small cell in a geographic location within a cellular network for handling at least a portion of a cellular network traffic with respect to a cellular network resource, the method comprising:

identifying, by at least one computer processor, at least one user device, the at least one user device communicatively coupled to the cellular network resource via a cell of the cellular network;

determining, by the at least one computer processor, a physical geographic location of the at least one user device;

collecting information, by the at least one computer processor, related to usage of the cellular network resource by the at least one user device;

generating, by the at least one computer processor, an electronic notification to place a small cell in the physical geographic location, upon determination based on the collected information that a usage threshold relating to the cellular network resource was crossed, wherein said usage threshold comprises at least one of:

a predetermined percentage, fraction, or portion of total available bandwidth within a given time period;

a single user device requiring greater than a predetermined percentage, fraction, or portion of total bandwidth within a given time period; or a single user device requiring greater than a predetermined percentage, fraction, or portion of total available usage of the cellular network resource within a given time period; and transmitting, by the at least one processor, said electronic notification to place said small cell in the physical geographic location, wherein said small cell once placed comprises:
a cell in a cellular network served by a low power cellular base station,
said low power cellular base station covering a limited area, and
said small cell comprising at least one of:
a microcell,
a picocell, or
a femtocell; and wherein said determining comprises:
determining, by the at least one processor, an area from a plurality of physical geographic locations of a plurality of said user devices, to be used to place said small cell within the area, and to be included in said electronic notification generated; and
storing a list of said plurality of said physical geographic locations in which to place said small cell.

2. The computerized method of claim 1, further comprising determining, by the at least a processor, the usage threshold.

3. The computerized method of claim 2, wherein determining the usage threshold further comprises determining, by the at least a processor, a bandwidth provided by the network resource to the at least a user device.

4. The computerized method of claim 2, wherein determining the usage threshold further comprises determining, by the at least a processor, an amount of data provided by the cellular network resource to the at least a user device within a time frame.

5. The computerized method of claim 2, wherein determining the usage threshold further comprises determining, by the at least a processor, the strength of the radio frequency (RF) signal provided to the at least a user device.

6. The computerized method of claim 1, further comprising:
wherein said at least one user device comprises:
a plurality of said user devices; and
wherein said physical geographic location comprises:
a plurality of said physical geographic locations, each corresponding to each of said plurality of said user devices.

7. A system for determining the need to place a small cell in a location within a cellular network for handling at least a portion of cellular network traffic with respect to a cellular network resource, comprising:
a placement computing device comprising:
a computer processing unit;
a network interface communicatively coupled to the computer processing unit;
a memory communicatively coupled to the processing unit, the memory containing instructions that when executed by the computer processing unit configure the system to:
identify at least one user device, the at least one user device communicatively coupled to the cellular network resource via a cell of the cellular network;
determine a physical geographic location of the at least one user device;
collect information related to the usage of the cellular network resource by the at least one user device; and
generate an electronic notification to place a small cell in the physical geographic location, upon determination based on the collected information that a usage threshold of the cellular network resource was crossed,
wherein said usage threshold comprises at least one of:
a predetermined percentage, fraction, or portion of total available bandwidth within a given time period;
a single user device requiring greater than a predetermined percentage, fraction, or portion of total bandwidth within a given time period; or
a single user device requiring greater than a predetermined percentage, fraction, or portion of total available usage of the cellular network resource within a given time period; and
transmit said electronic notification to place said small cell in the physical geographic location,
wherein said small cell once placed comprises:
a cell in a cellular network served by a low power cellular base station,
said low power cellular base station covers a limited area, and
said small cell comprising at least one of:
a microcell,
a picocell, or
a femtocell; and
wherein said instructions to determine comprise:
instructions that when executed by the computer processing unit configure the system to:
determine an area from a plurality of said physical geographic locations of a plurality of user devices, to be used to place said small cell within the area, and to be included in said electronic notification generated; and
store a list in the memory of said plurality of said physical geographic locations in which to place said small cell.

8. The system of claim 7, further comprising instructions that when executed by the processing unit configure the system to determine the usage threshold.

9. The system of claim 8, further comprising instructions that when executed by the processing unit configure the system to determine a bandwidth provided by the network resource to the at least a user device.

10. The system of claim 8, further comprising instructions that when executed by the processing unit configure the system to determine an amount of data provided by the network resource to the at least a user device within a time frame.

11. The system of claim 8, further comprising instructions that when executed by the processing unit configure the system to determine the strength of the radio frequency (RF) signal provided to the at least a user device.

12. The system of claim 7, further comprising:
wherein said at least one user device comprises:
a plurality of said user devices; and
wherein said physical geographic location comprises:
a plurality of said physical geographic locations, each corresponding to each of said plurality of said user devices.

13. A computer program product embodied on a nontransitory computer accessible medium, the computer program product comprising instructions, which when executed by a computer processing unit, performs a method of determining the need to place a small cell in a geographic location within a cellular network for handling at least a portion of a cellular network traffic with respect to a cellular network resource, the method comprising:

identifying at least one user device, the at least one user device communicatively coupled to the cellular network resource via a cell of the cellular network;

determining a physical geographic location of the at least one user device;

collecting information related to usage of the cellular network resource by the at least one user device; and generating an electronic notification to place a small cell in the physical geographic location, upon determination based on the collected information that a usage threshold relating to the cellular network resource was crossed, wherein said usage threshold comprises at least one of:
a predetermined percentage, fraction, or portion of total available bandwidth within a given time period;
a single user device requiring greater than a predetermined percentage, fraction, or portion of total bandwidth within a given time period; or
a single user device requiring greater than a predetermined percentage, fraction, or portion of total available usage of the cellular network resource within a given time period; and transmitting, by the at least one processor, said electronic notification to place said small cell in the physical geographic location, wherein said small cell once placed comprises:
a cell in a cellular network served by a low power cellular base station,
said low power cellular base station covering a limited area, and said small cell comprising at least one of:
a microcell,
a picocell, or
a femtocell; and wherein said determining comprises:
determining an area from a plurality of said physical geographic locations of a plurality of said user devices, to be used to place said small cell within the area, and to be included in said electronic notification generated; and storing a list of said plurality of said physical geographic locations in which to place said small cell.

14. The computer program product of claim 13, wherein the method further comprises: determining the usage threshold.

15. The computer program product of claim 14, wherein the determining the usage threshold of the method further comprises determining a bandwidth provided by the network resource to the at least a user device.

16. The computer program product of claim 14, wherein the determining the usage threshold of the method further comprises determining an amount of data provided by the cellular network resource to the at least a user device within a time frame.

17. The computer program product of claim 14, wherein determining the usage threshold of the method further comprises determining the strength of the radio frequency (RF) signal provided to the at least a user device.

18. The computer program product of claim 13, further comprising:
wherein the method comprises wherein said at least one user device comprises:
a plurality of said user devices; and
wherein said physical geographic location comprises:
a plurality of said physical geographic locations, each corresponding to each of said plurality of said user devices.

19. The computerized method of claim 1, wherein the method further comprises:
wherein each of said user devices is associated with both of:
said cellular network; and
a small cell network of said small cell added in response to said generated notification; and
wherein said identifying, said determining, said collecting, said generating, and said transmitting are performed by the at least one processor, wherein the at least one processor is part of a placement server device coupled to said cellular network and said small cell network.

20. The computerized method of claim 19,
wherein said physical geographic location for placement of said small cell network is indoors; and
wherein said small cell network is not a Wi-Fi network.

* * * * *